United States Patent [19]

Kronberg

[11] Patent Number: 5,119,014
[45] Date of Patent: Jun. 2, 1992

[54] SEQUENTIAL POWER-UP CIRCUIT

[76] Inventor: James W. Kronberg, 108 Independent Blvd., Aiken, S.C. 29801

[21] Appl. No.: 664,915

[22] Filed: Mar. 5, 1991

[51] Int. Cl.$^5$ .............................................. G05F 1/44
[52] U.S. Cl. ................................... 323/267; 323/272; 323/901; 307/41
[58] Field of Search .............. 323/267, 268, 271, 272, 323/901; 307/39, 40, 41, 112, 113, 115, 141

[56] References Cited

U.S. PATENT DOCUMENTS

| | | | |
|---|---|---|---|
| 3,754,181 | 8/1973 | Kreitz et al. | 323/1 |
| 3,984,699 | 10/1976 | Bailey | 307/41 |
| 4,030,024 | 6/1977 | Chambers et al. | 323/17 |
| 4,034,232 | 7/1977 | LaVenture | 307/32 |
| 4,199,690 | 4/1980 | Meyer | 307/41 |
| 4,321,477 | 3/1982 | Barlett | 307/41 |
| 4,368,420 | 1/1983 | Kuo | 323/303 |
| 4,375,614 | 3/1983 | Steiner | 323/280 |
| 4,419,590 | 12/1983 | Voss | 307/41 |
| 4,460,951 | 7/1984 | Fenter et al. | 363/49 |
| 4,461,990 | 7/1984 | Bloomer | 323/235 |
| 4,547,843 | 10/1985 | Hucker | 363/67 |
| 4,697,229 | 9/1987 | Davy et al. | 363/49 |
| 4,716,510 | 12/1987 | Pace et al. | 363/49 |
| 4,736,116 | 4/1988 | Pavlak, Jr. et al. | 307/41 |
| 4,829,230 | 5/1989 | Perry | 323/273 |
| 4,878,164 | 10/1989 | Colombo | 363/49 |
| 4,890,212 | 12/1989 | Kumon et al. | 363/49 |

Primary Examiner—Peter S. Wong
Attorney, Agent, or Firm—Harold M. Dixon; William R. Moser; Richard E. Constant

[57] ABSTRACT

A sequential power-up circuit for starting several electrical load elements in series to avoid excessive current surge, comprising a voltage ramp generator and a set of voltage comparators, each comparator having a different reference voltage and interfacing with a switch that is capable of turning on one of the load elements. As the voltage rises, it passes the reference voltages one at a time and causes the switch corresponding to that voltage to turn on its load element. The ramp is turned on and off by a single switch or by a logic-level electrical signal. The ramp rate for turning on the load element is relatively slow and the rate for turning the elements off is relatively fast. Optionally, the duration of each interval of time between the turning on of the load elements is programmable.

16 Claims, 2 Drawing Sheets

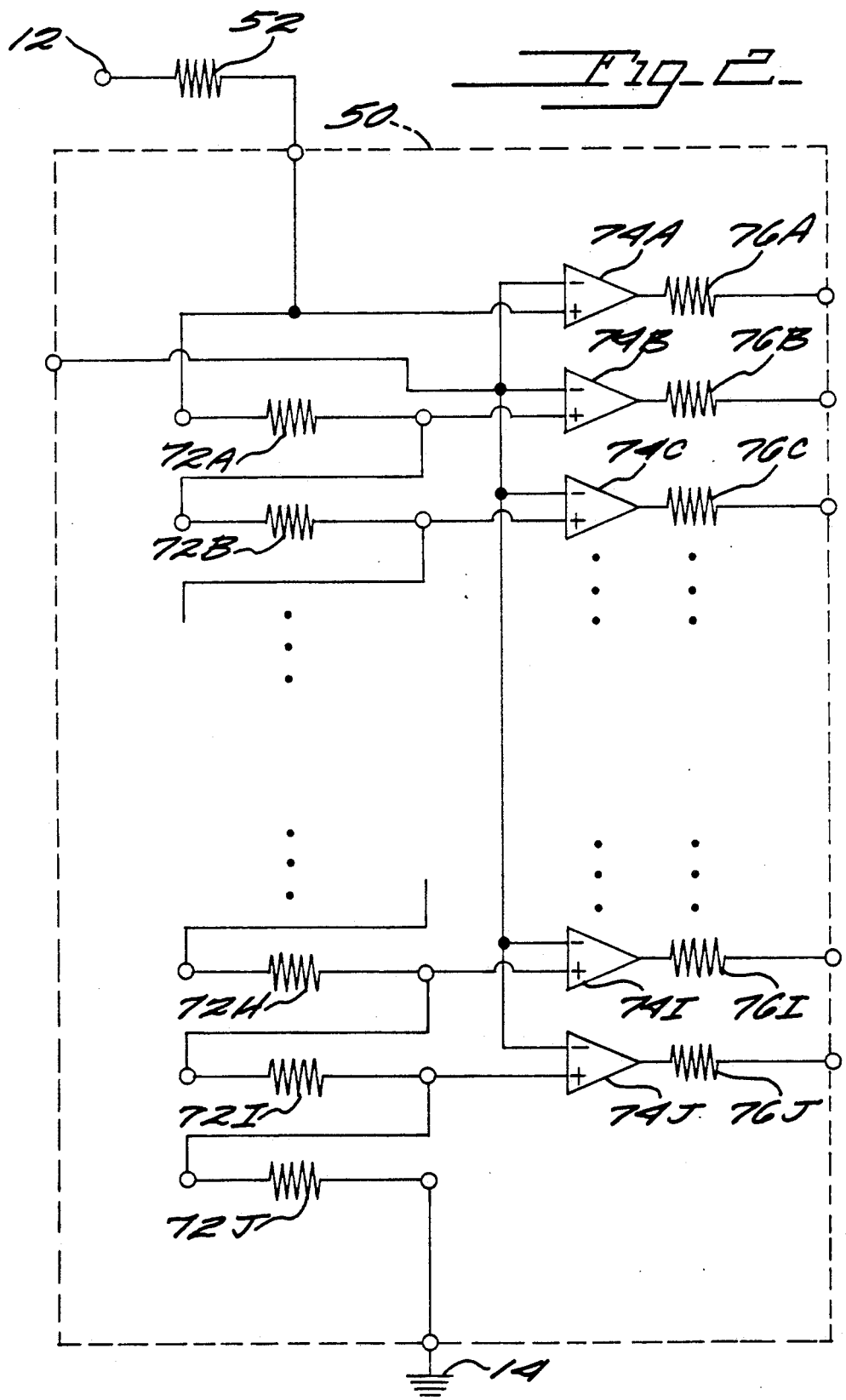

SEQUENTIAL POWER-UP CIRCUIT

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to electronic circuitry for starting a sequence of electrical load elements.

2. Discussion of Background

Some electrical devices, such as motors and incandescent lamps, draw significantly higher levels of current during the first few seconds after starting than they do in steady-state operation. Switchgear and wiring for this equipment must be sized to accommodate the maximum current drawn, rather than the steady-state value. Breaking a combined load into several segments and bringing each segment on line at a slightly different time, so that their high-demand starting periods do not overlap, can reduce the peak current level dramatically. This method has particular advantages in computer-controlled systems, where even brief power transients can interrupt the system.

Many common electrical devices have radically different characteristics at the beginning of operation than they do in steady-state operation. In some cases, the difference causes a brief "starting surge" in which the current demand of the device rises quickly to a high value, then drops to a moderate value as the device reaches its normal, steady-state operating conditions. In some cases the peak value of the current may be over ten times the steady state value. The duration of the surge may range from several minutes down to a fraction of a second.

The causes of starting surge are varied, and may include changes in device resistance, inductance, or other, more complex, mechanisms. For example, because electrons are scattered by lattice vibrations, the electrical resistance of most metals increases with temperature. A tungsten light-bulb filament may have only one-tenth the resistance at room temperature that it has at white heat. When first turned on, therefore, the bulb draws a high level of current until the filament heats up. Although less dramatic, because working temperatures are usually lower, the same effect is present in most resistance heaters.

An A.C.-driven solenoid device, such as a solenoid valve or relay, consists of a coil wound on a magnetic armature that has one or more moving parts. When de-energized, the armature is held by springs in a mechanically and magnetically "open" position. Current flowing in the coil creates magnetic flux which overcomes the spring force and pulls the armature to a "closed" position, increasing the magnetic permeability of the circuit, and hence the coil inductance. Since current in an A.C. coil is chiefly inductance-limited, the current drawn is high while the armature is open but drops to a much lower value once it is closed.

In another example, a turning motor generates a voltage, or "back" electro-motive force (E.M.F.) which is proportional to motor speed and which normally opposes the applied voltage. The current drawn is proportional to the difference between the applied voltage and the back E.M.F. At low speeds, as on startup, there is little back E.M.F. and hence the current may be several times that drawn at high speeds.

In converting A.C. to D.C., a power supply usually charges a large electrolytic capacitor to a voltage well above the rated output; D.C. is then drawn from the capacitor and regulated downward to the desired voltage. During startup, a larger current is drawn to charge this capacitor from zero voltage up to its working level.

Starting surge is thus very common, and account must be taken of it in the design of any electrical or electronic system. Wiring and switchgear must be specified for the maximum value, and not merely the steady-state value, of the current which will flow through them, and batteries, power supplies and generators, for the maximum which they will be called upon to produce.

Failure to take starting surge into account can cause transient power disturbances or, in extreme cases, total system failure. Modern, computerized control systems are especially vulnerable because even split-second power interruptions can interfere with critical operations or cause data loss.

Starting surge can be mitigated by placing current-limiting devices, such as thermistors, in the current path. Long-life light bulbs, for example, may contain such devices. Current limiting, however, almost always degrades the performance of a device to which it is applied, since the limiter typically remains in the circuit after start-up and, thus, continues to consume power and reduce the available voltage during steady-state operation.

A reliable and widely-applicable method of reducing starting surge or its impact on electrical systems, without compromising the performance of the devices drawing the surge currents, would increase both the economy and the reliability of any system of which it was a part.

Starting surge can be reduced dramatically by switching some one or some few devices on at a time, rather than many together, and allowing enough time between switching operations for a surge associated with one device to die away before the next begins. For example, a group of four devices, each drawing ten amperes on startup but only two during normal operation, draws a peak current of forty amperes if all four devices are switched at once. If, however, the four devices are switched on separately, allowing one to approach steady state before the next is turned on, the peak current will only be sixteen amperes, a mere forty percent of the peak value of simultaneous start-up.

Use of sequential power-up to minimize surge is not new; it has long been used in high-power equipment, particularly in motor control centers. Classically, sequential power-up takes place under the control of thermal delay relays. More recently, the task has often been assigned to programmable controllers, or to arrays of integrated circuits such as the MC14541 and LS7210 programmable timers, which can provide individual delays from a few milliseconds to several hours.

All of the foregoing approaches have disadvantages. Thermal relays are cheap, but they include both heating elements, which can burn out, and mechanical contacts, which can wear or become pitted by repeated arcing. Programmable controllers, on the other hand, are reliable but expensive, and require time and usually special training to set up. Individual timer chips are low in cost, but to control each successive load segment requires a separate chip plus a number of outboard, passive components, and networks that typically require custom design and fabrication.

SUMMARY OF THE INVENTION

According to its major aspects, the present invention consists of a simple circuit for performing sequential power-up of electrical loads, notably those that draw a relatively larger current upon start-up than at steady state operation, which circuit is compatible with standard logic level voltages, may be implemented on a silicon chip with only a few external components, can handle up to ten separate load segments in its simplest form, and a larger number of loads if necessary.

In particular the present invention comprises a time-varying signal generator, a set of reference signals, one for each electrical load, and an array of comparators for comparing the reference signals against the time-varying signal so that, when the time-varying signal equals one of the reference signals, the electrical load corresponding to that reference signal is activated. The time-varying signal is preferably a voltage signal, and most preferably a voltage signal that increases relatively slowly and linearly when the device is turned on and falls rapidly when the device is turned off. The reference signals are then reference-voltage steps that can be uniform voltage steps or individually programmed steps. If the time-varying voltage signal is linear, equal reference voltages will result in the electrical loads being turned on after equal intervals of time. Alternatively, if the voltages are programmed individually, the time intervals can be made to vary as desired. Furthermore, if the time-varying voltage signal increases to a maximum voltage when the device is turned on, then the loads can be activated when the reference voltages are equalled or exceeded and deactivated otherwise. Preferably, the switches that turn on the electrical loads on receipt of output from the comparators would be optically-isolated, solid-state relays, and the comparators and reference-voltage sources for equal intervals of time between start-up of the loads would be circuit elements contained in a standard bargraph display driver integrated circuit, such as the LM3914.

The simplicity of the present invention is an important feature of it. The components are readily available and inexpensive. Furthermore, the device can be embodied essentially on a single integrated circuit chip. The advantage of simplicity is overall low cost of manufacture and accessibility in a broader range of applications.

Another feature of the present invention is the way the voltage generator combines with the comparator to trigger the start-up of the load elements. Ramping up a voltage over time and using the instantaneous voltage in comparison to reference voltages to trigger the load elements in sequence is a simple and effective means of sequencing the start-ups. Furthermore, the same basic technique is readily adaptable to achieve varied time intervals between loads in situations where some of the loads may need more time to reach steady state than others. This feature gives the present invention considerable flexibility.

Still another feature of the present invention that provides flexibility is the unitizing of the comparators, preferably by employing bargraph display drivers, so that several sets of comparators can be used in sequence, cascading comparators to accommodate virtually any number of load elements.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 2 shows a detailed portion of an alternative embodiment according to the present invention.

DETAILED DESCRIPTION OF PREFERRED EMBODIMENTS

Figure 1:
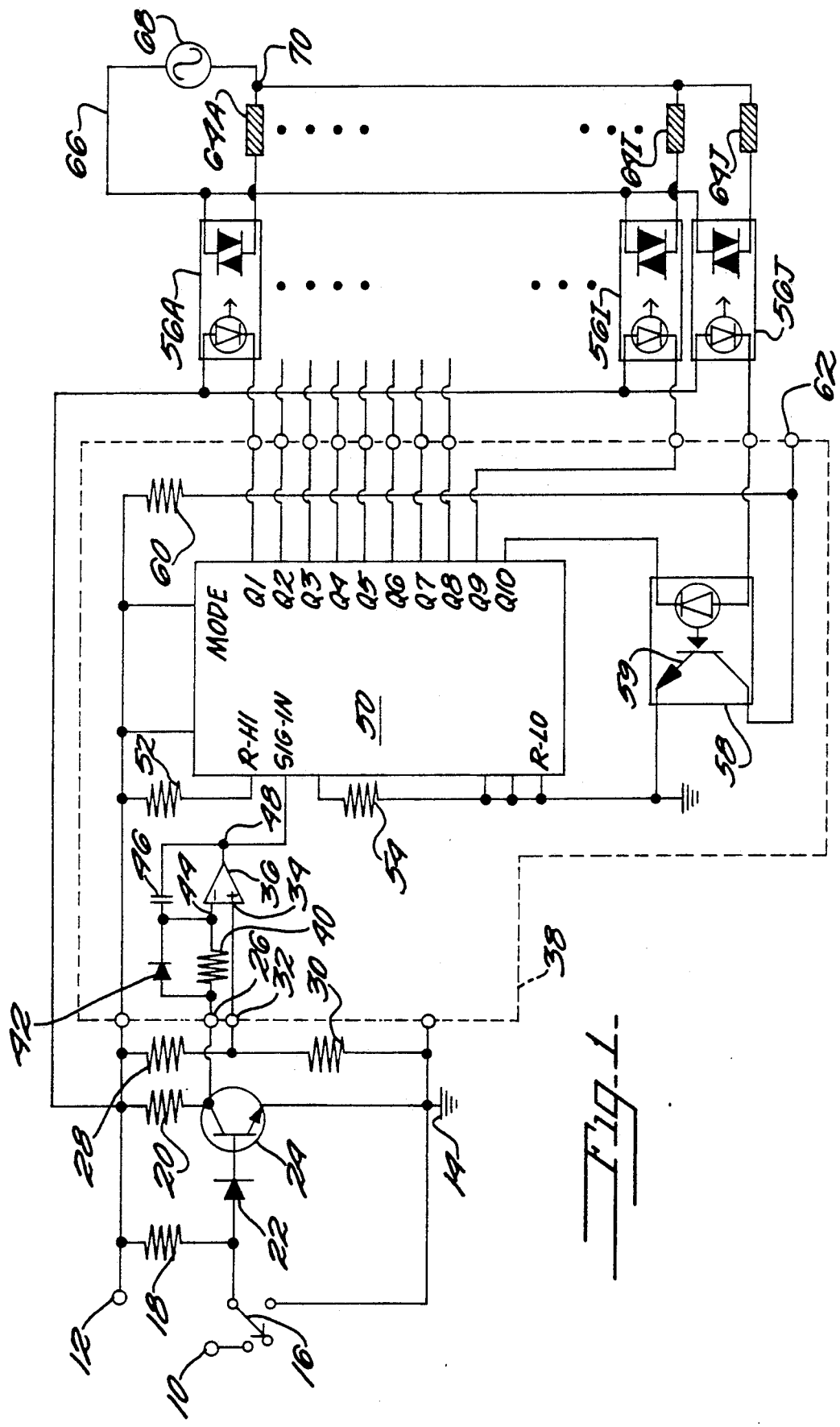
FIG. 1 is an electronic circuit showing a preferred embodiment according to a present invention.

The present invention provides a simple method for starting up several (nominally ten for illustration purposes) different electrical loads at equally-spaced intervals, ranging from a few milliseconds to several minutes each. Optionally, and at some slight cost in added circuit complexity, the intervals may be made unequal and individually programmable. Larger numbers of load segments can be accommodated by multiple copies of the basic circuit joined in cascade. The circuit of the present invention may be built up from readily available integrated circuits plus a minimum number of external components or, alternatively, all circuit functions may be combined in a single silicon chip.

A ramp generator circuit is configured, using selected components to generate a steadily increasing, or ramp-up, voltage level and a steadily decreasing, or ramp-down, voltage level. The ramp-up occurs at a relatively slow rate; the ramp-down, however, occurs at a much faster rate. The ramp generator is controlled by an input stage that accepts standard logic level signals (transistor-transistor logic or "TTL", for instance) in such a way that on one input state the output will ramp up to some maximum voltage and then remain constant so long as the input remains in that state. When the input stage switches to the other state, the ramp generator ramps down to a minimum voltage and again remains constant until the input stage again changes state.

The ramp signal is fed to an array of voltage comparators referenced to a series of fixed voltages separated by voltage steps. In one preferred embodiment, these voltage steps are equal. Since the ramp is very nearly linear, these steps correspond to equal intervals of time. The duration of an interval in this embodiment is set by the user to match the starting surge duration of the devices being controlled. During ramp-down, the durations are so short that all load segments are turned off virtually at once.

The interface between the output of the comparators and the input to the loads may consist of any standard means, such as transistors, electromechanical relays or solid-state relays, as desired. However, optically-isolated, solid-state relays are particularly well-suited to this application and are therefore preferred, since they may be driven directly by the relatively low currents available at typical integrated-circuit, voltage comparator outputs and are available in both A.C. and D.C. output versions at a wide variety of current ratings.

In the two preferred embodiments described, each accepts either a TTL-type logic input signal ("zero"=0.4 volts or lower; "one"=2 volts or higher) or other common type logic level signal of like characteristics, or a manually-switched control signal, and provides ten outputs which may be used to control external load segments. The duration of switching intervals is user-programmable through resistor and capacitor selection. The embodiments differ in that the first is simpler but requires all intervals to be equal, while in the second—at some cost in added complexity—all ten are individually programmable.

Referring now to FIG. 1, a TTL-type signal is applied to terminal 10, and +12 volt D.C. from a power supply or battery to terminal 12; both are referenced to a common ground 14. A three position manual switch 16 permits selection of the TTL input, ground or an open circuit.

Resistors 18 and 20, diode 22 and NPN transistor 24 make up a simple RTL inverter and voltage-level shifter. With TTL "one" input, or with an open circuit, selected by switch 16, current flows through resistor 18 and diode 22, through the base-emitter junction of transistor 24, and thence to ground, turning the transistor on. Current flowing through resistor 20 is thereby shunted to ground, holding terminal 26, connected to the collector of transistor 24, at roughly ground potential. With TTL "zero" input, or with switch 16 connected to ground, current in resistor 18 is shunted to ground through switch 16. Diode 22 and transistor 24 are turned off, no significant current flows through transistor 24 from resistor 20 and terminal 26 is held close to the supply potential of +12 V.

Resistors 28 and 30 form a voltage divider, holding terminal 32 and noninverting terminal 34 of operational amplifier 36 at approximately one-half the supply potential. Operational amplifier 36 is preferably an FET-input type, such as an LH13741, powered by the +12 V and ground rails. Terminal 32 is provided to simplify the connection of basic circuit blocks in cascade when more than ten load segments must be driven. For this purpose, the basic circuit block corresponds to that portion of the schematic which is enclosed by outline 38. Preferably, these components are assembled on a separate board or in a separate module from the others shown, to facilitate connection in this way. A single RTL input stage and voltage divider will drive virtually any number of cascaded basic circuit blocks.

Terminal 26, bearing the inverted and voltage-shifted control signal, is connected through resistor 40 and diode 42 to inverting input 44 of operational amplifier 36, which in turn is connected through nonpolarized capacitor 46 to output terminal 48 of the amplifier. These components thereby form an integrated (and inverting) ramp generator having the characteristics previously set forth, namely, relatively slow ramp-up rate and much faster ramp-down rate. Inversions in the ramp generator and in the RTL stage cancel each other, so that the net effect is to ramp the output voltage at terminal 48 slowly upward on a TTL "one" input or an open circuit at switch 16, and quickly downward again when TTL "zero" is input or the switch is turned to "ground" position.

The rate of upward ramping at terminal 48 is determined by the R-C time constant of resistor 40 and capacitor 46. For example, if the time constant is one second, the output rises at six volts per second. The downward ramp rate is not useradjustable in the preferred embodiment, and is on the order of 500 volts per second.

The ramp voltage is applied to the signal input "SIG-IN" of an integrated-circuit L.E.D. bargraph display driver 50, preferably an LM-3914, containing ten voltage comparators and a voltage divider chain of ten equal resistances. This driver is powered by the +12 V and ground rails. The lower end of the divider chain "R-LO" is grounded; the upper end "R-HI" is powered by the +12 V supply through a resistor 52, which preferably has twice the resistance of a single element of the voltage divider within driver 50; in the LM3914 this is 1000 ohms, so a 2000-ohm resistor is needed. With a 12-volt supply, this makes each reference voltage step equal to one volt.

Outputs Q1 through Q10 of the LM-3914 are current-limited, with a single external programming resistor 54 setting the limit; if a different driver type is used, a different method, such as the use of current-limiting resistors, may be needed. If an LM-3914 is used, the "MODE" pin is connected to the positive supply so that more than one output may be turned on at a time.

On ramp-up, each output Q1–Q10 is turned on (sinking current) as the ramp rises past the corresponding reference voltages. With one-volt steps, each switching interval is therefore the time needed for the ramp voltage to rise by one volt; this, in turn, equals one-sixth of the R-C time constant set by resistor 40 and capacitor 46. Using a one-microfarad capacitor and a ten-megohm resistor, for instance, gives intervals of 1.67 seconds.

Outputs Q1 through Q9 of bargraph driver 50 are connected, by remote wiring if necessary, to optically-isolated, solid-state relays 56A through 56I located near each load segments 64A through 64J. Output Q10, the last output to be activated during ramp-up, is connected similarly to solid-state relay 56J, but with the L.E.D. of a second optical isolator 58 placed in series with that of relay 56J. Isolator 58 has a phototransistor 59 (not photo-Darlington) output, and is preferably a 4N28 or equivalent type.

When output Q10 is turned off, the L.E.D. of isolator 58 is dark and no significant current flows through phototransistor 59; current flowing through resistor 60 therefore holds terminal 62 close to the supply potential. On activation of output Q10, current flows through the L.E.D., which turns on phototransistor 59 and shunts the current in resistor 60 to ground, pulling terminal 62 approximately to ground potential. Resistor 60 and isolator 58 are thus analogous to resistor 20 and transistor 24 in the RTL input stage. Basic circuit blocks may be cascaded by connecting terminal 62 of each to terminal 26 of the next and tying all terminals 32 in common.

With cascaded blocks, the upward ramp of the first block turns on all of its outputs in sequence, with Q10 last. Activation of Q10 also starts the upward ramp of the second block. The second block may trigger a third, the third a fourth, and so on; all Q1–Q10 outputs will turn on in sequence and, provided that resistor 40 and capacitor 46 produce the same R-C time constant for each block, all switching intervals will be approximately equal. For mixed loads whose segments have greatly differing characteristics, it may be advantageous to choose a different time constant for each block. Ramp-down turns off each block's outputs in reverse order and with much shorter intervals. Because ramp-down turns off Q10 before the other inputs, each block triggers the next almost at once and all blocks undergo ramp-down at virtually the same time.

Any convenient means may be used in connecting the various load segments 64A through 64J to relays 56A through 56J, respectively. Typically, one A.C. terminal of each relay would be connected to a "hot" conductor 66 leading from a transformer or other A.C. source 68;

the other A.C. terminal of each relay would be connected to one side of the corresponding load element, and the other side of the load element to the "neutral" conductor 70 leading back to source 68, as shown in the schematic. Depending upon the application, however, any one of a large number of alternate connection schemes may be preferable to the one shown.

The second embodiment of the invention differs from the first only in that the functional block 50 is built up from individual voltage comparators and discrete, user-supplied resistors, rather than being supplied by a single integrated circuit. This provides added flexibility, in that the length of each switching interval can be programmed individually. Only a partial schematic is shown in FIG. 2, corresponding to block 50 of FIG. 1, along with a few external components.

Provision is made in the second embodiment for user installation of ten discrete resistors 72A through 72J. These form a voltage-divider chain supplying ten reference voltages to comparators 74A through 74J, which are preferably LM339 type or an equivalent. The noninverting input of each is fed by the appropriate node in the voltage divider, while all inverting inputs are tied together and fed by the ramp voltage from terminal 48, corresponding to the signal input of the LM3914. Resistor 54, used to set the output current limit in the LM3914, is replaced by separate resistors 76A through 76J, each connected at one end to the output of the corresponding voltage comparator. The opposite ends of these resistors correspond to LM3914 outputs, but in reverse order: resistor 76J representing Q1, 76I representing Q2, and so forth.

To program the second embodiment of the invention, the total time delay (sum of the ten individual delays) is first calculated, and resistor 40 and capacitor 46 are specified. Individual delays are then expressed as percentages of the total. Assuming that resistor 52 is 2000 ohms (as in the first embodiment), each resistor 72A through 72J will equal 98 ohms multiplied by the corresponding percentage (0-100). Because the output of operational amplifier 36 will generally not pull the ramp voltage lower than about 0.2 volts, an extra 200 ohms should be added to the calculated value for resistor 72J. Calculated values are then rounded off to the nearest available, 1%-, 5%- or 10%-tolerance stock resistor values, depending on the desired accuracy, and chosen components are inserted into the corresponding sockets.

All components used in the second embodiment, whether shown here or not, are powered by the 12+ volt supply connected between supply terminal 12 and ground 14. If necessary, multiple basic circuit blocks 38 may be connected together in the second embodiment just as in the first.

Either of the embodiments described here may, if desired, be readily implemented on a single silicon chip with only the user-supplied components located externally.

It will be apparent to those skilled in the art that many changes and substitutions can be made to the preferred embodiment herein described without departing from the spirit and scope of the present invention. For example, the time-varying voltage signal could vary in other ways besides ramp-up to start the loads and ramp-down to shut off the loads. The change in voltage could be nonlinear as well. However, the scope of the invention will be defined by the appended claims.

What is claimed is:

1. A device for starting a plurality of electrical loads in a timed sequence, each of said plurality of electrical loads having a startup time defined by the interval of time required for the electrical current drawn by said load to reach steady state operation after said load is turned on, said device comprising:
    means for generating a linearly increasing or decreasing voltage signal, said linearly increasing or decreasing signal changing voltage at a rate of change;
    means for generating a sequence of preselected reference voltages, each preselected reference voltage in said sequence of preselected reference voltages corresponding to a different one of said plurality of electrical loads, said sequence of preselected reference voltages generated so that the voltage difference between any one preselected reference voltage, which corresponds to one of said electrical loads having a startup time, and the next preselected reference voltage in said sequence of preselected reference voltages, divided by said rate, yields a time interval at least longer than said startup time;
    means for comparing said linearly increasing or decreasing voltage signal to each preselected reference voltage in said sequence of preselected reference voltages; and
    means for activating each of said loads as said voltage signal passes said corresponding preselected voltage signal, whereby each of said plurality of loads is started in sequence.

2. The device as recited in claim 1, further comprising means for changing said preselected reference voltages.

3. The device as recited in claim 1, wherein said activating means further comprises optically-isolated, solid-state relays.

4. The device as recited in claim 1, wherein said comparing means includes a bargraph display driver integrated circuit.

5. The device as recited in claim 1, wherein said generating means generates a slowly increasing voltage signal when starting said plurality of electrical loads and a rapidly decreasing voltage signal otherwise.

6. The device as recited in claim 1, wherein said sequence of preselected voltages are an equal voltage difference apart so that the time intervals between startup of said plurality of electrical loads is equal.

7. The device as recited in claim 1, wherein said comparator means further comprises an array of voltage comparators.

8. A device for starting a plurality of electrical loads in a timed sequence, each of said plurality of electrical loads having a startup time defined by the interval of time required for the electrical current drawn by said load to reach steady state operation after said load is turned on, said device comprising:
    means for generating a linearly increasing or decreasing voltage signal, said linearly increasing or decreasing signal changing voltage at a rate of change;
    means for generating a sequence of reference voltages, each reference voltage in said sequence of reference voltages corresponding to a different one of said plurality of electrical loads, said sequence of reference voltages generated so that the voltage difference between any one reference voltage, which corresponds to one of said electrical loads having a startup time, and the next reference voltage in said sequence of reference voltages, divided by said rate, yields a time interval at least longer than said startup time;

means for selecting each of said reference voltages;

means for comparing said linearly increasing or decreasing voltage signal to each reference voltage in said sequence of reference voltages; and means for activating each of said loads as said voltage signal passes said corresponding preselected voltage signal, whereby each of said plurality of loads is started in sequence.

9. The device as recited in claim 8, wherein said activating means further comprises optically-isolated, solid state relays.

10. The device as recited in claim 8, wherein said generating means generates a slowly increasing voltage signal when starting said plurality of electrical loads and a rapidly decreasing voltage signal otherwise.

11. The device as recited in claim 8, wherein said comparator means further comprises an array of voltage comparators.

12. A device for starting a plurality of electrical loads in a timed sequence, each of said plurality of electrical loads having a startup time defined by the interval of time required for the electrical current drawn by said load to reach steady state operation after said load is turned on, said device comprising:

means for generating a linearly increasing voltage signal, said linearly increasing signal changing voltage at a rate of increase;

means for generating a sequence of preselected reference voltages, each preselected reference voltage in said sequence of preselected reference voltages corresponding to a different one of said plurality of electrical loads, said sequence of preselected reference voltages generated so that the voltage difference between any one preselected reference voltage, which corresponds to one of said electrical loads having a startup time, and the next preselected reference voltage in said sequence of preselected reference voltages is constant;

means for comparing said linearly increasing or decreasing voltage signal to each preselected reference voltage in said sequence of preselected reference voltages; and means for activating each of said loads as said voltage signal passes said corresponding preselected voltage signal, whereby each of said plurality of loads is started in sequence.

13. The device as recited in claim 12, wherein said activating means further comprises optically-isolated, solid-state relays.

14. The device as recited in claim 12, wherein said comparator means further comprises an array of voltage comparators and a voltage divider chain having equal resistances.

15. The device as recited in claim 12, wherein said comparing means includes at least one bargraph display driver integrated circuit.

16. The device as recited in claim 12, wherein said generating means generates a slowly increasing voltage signal when starting said plurality of electrical loads and a rapidly decreasing voltage signal otherwise.

* * * * *